United States Patent [19]

Massa et al.

[11] 3,949,349

[45] Apr. 6, 1976

[54] DUAL ELECTROACOUSTIC TRANSDUCERS

[75] Inventors: Frank Massa; Donald P. Massa, both of Cohasset, Mass.

[73] Assignees: Fred M. Dellorfano, Jr.; Donald P. Massa, both of Cohasset, Mass. ; Trustees of the Stoneleigh Trust u/d/t December 4, 1973

[22] Filed: Feb. 13, 1974

[21] Appl. No.: 442,214

Related U.S. Application Data

[63] Continuation of Ser. No. 243,694, April 13, 1972, abandoned.

[52] U.S. Cl. .................... 340/10; 310/8.4; 310/9.1; 340/9

[51] Int. Cl.[2] .......................................... H04B 13/00

[58] Field of Search .......... 340/8, 9, 10, 11, 12, 13, 340/14; 181/5 A; 310/8.4, 9.1

[56] References Cited

UNITED STATES PATENTS

| | | | |
|---|---|---|---|
| 2,963,681 | 12/1960 | Morgan | 340/8 |
| 3,457,547 | 7/1969 | Akervold et al. | 340/10 |
| 3,478,309 | 11/1969 | Massa, Jr. | 340/9 |
| 3,505,639 | 4/1970 | Chervenak | 340/9 |

*Primary Examiner*—Samuel W. Engle
*Assistant Examiner*—Harold Tudor

[57] ABSTRACT

Electroacoustic transducers are nested to provide a centrally vibrating portion and a peripherally vibrating portion. The phases of the two transducers may be adjusted with respect to each other in order to provide a variety of beam patterns.

6 Claims, 5 Drawing Figures

DUAL ELECTROACOUSTIC TRANSDUCERS

This is a continuation of application Ser. No. 243,694, filed Apr. 13, 1972, now abandoned.

This invention relates to electroacoustic transducers and particularly to transducer structures for achieving controlled beam patterns.

Many different sonic systems require many different beam patterns. Heretofore, it has generally been necessary to accept the more or less standard beam patterns which are produced by a more or less standard transducer design. While it is possible to modify the transducer somewhat, and thereby modify the beam patterns somewhat, there are distinct limitations upon what can be done.

A prior suggestion uses a clamped diaphragm with a center portion vibrating 180° out of phase with the peripheral portion. Then a sound masking device is placed over the center portion to modify the relationship between sound waves radiated from the two portions. Different effects may be produced by properly selecting the design of the sound masking means. However, it has not been possible to continuously vary the relationship at the will of the user.

Accordingly, an object of this invention is to provide a transducer incorporating at least two independent vibratile structures driven by independent electromechanical transducer elements. Here, an object is to provide means for varying the relative amplitudes of the sounds from the two structures. In this connection, an object is to provide a configuration of vibratile structures which are separately controlled to achieve a specially desired beam pattern.

Another object of this invention is to provide a dual transducer structure in which one transducer is physically nested within another, whereby a smaller transducer is placed within a clearance opening provided in a vibrating piston of a larger transducer.

Still another object of this invention is to provide a transducer with a composite vibrating surface. Here, an object is to provide at least two completely separate transducer structures with one of said separate transducer structures having a radiating surface comprising an annular vibratile plate having an opening near its center, and another of said separate transducers having a radiating surface comprising a vibratile piston which fits within the opening of the annular plate member of the first transducer.

In keeping with an aspect of the invention, a composite electroacoustic transducer comprises two separate, coaxially arranged, mass loaded, ceramic driven transducers. The larger transducer includes a vibratile annular plate driven by a hollow cylindrical polarized ceramic assembly. The smaller transducer includes a vibratile piston having a diameter smaller than the clearance hole in the annular plate member of the larger transducer. The smaller transducer is driven by polarized ceramic elements having external dimensions which fit within the space inside the hollow cylindrical configuration of the larger transducer. In this composite transducer structure, the two separate transducers drive separate vibratile plates nested one inside the other and held together in independent vibratile relationship by a flexible suspension bridging the space between the two nested vibratile plates.

Other objects and a fuller understanding of our invention may be had by referring to the following description and claims, taken in conjunction with the following drawings, in which:

Figure 1:
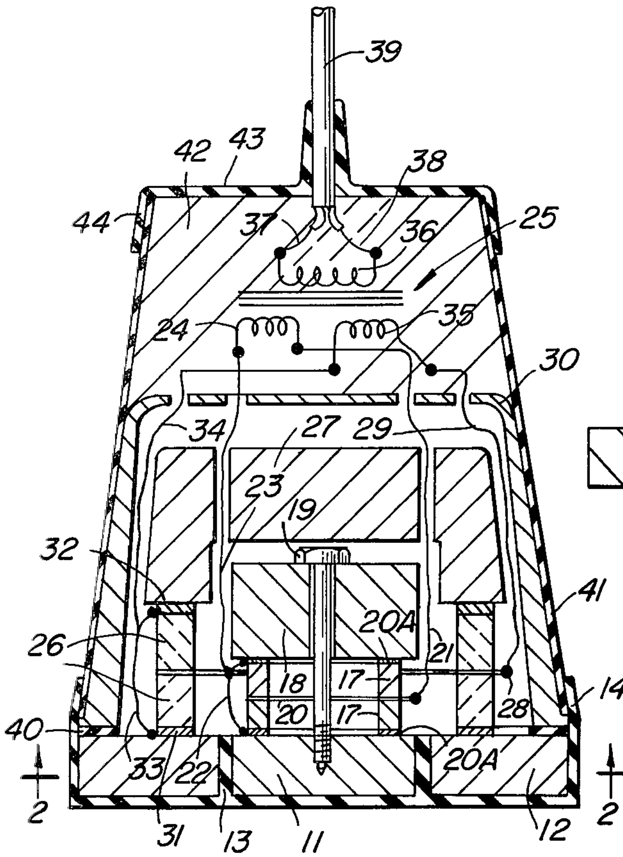
FIG. 1 is a cross-sectional view taken along the line 1—1 of FIG. 2 and showing an exemplary common transducer housing enclosing two nested transducers.
Figure 2:
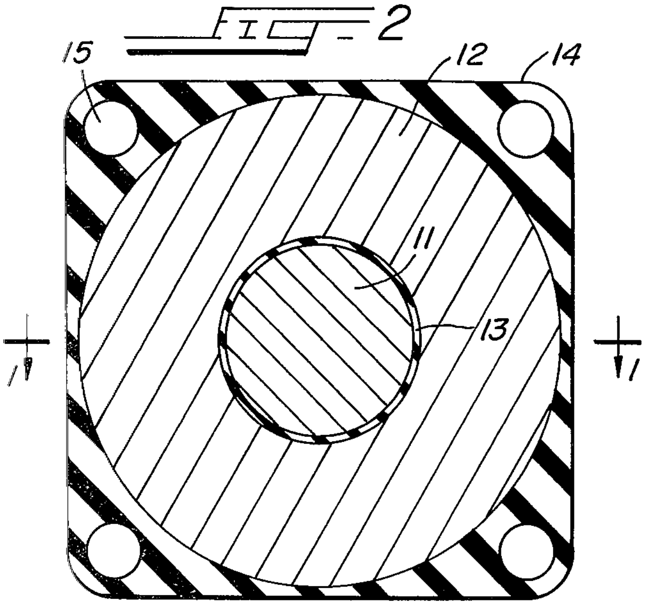
FIG. 2 is a cross-sectional view taken along the line 2—2 of FIG. 1.

In FIGS. 1 and 2, the reference character 11 identifies a circular piston plate centrally located and nested within an annular piston plate member 12. Both of these piston plate members are arranged to form a compound piston comprising two plates with their surfaces located in the same plane. They are held together by a flexible bridge member in the form of molded rubber-like material 13 which fills the space between the concentric vibratile plates and covers the outer radiating surfaces of the vibratile plates. The molded rubber also forms a skirt-like portion 14 surrounding the outer periphery of the assembly. In the illustration shown, the annular piston plate member 12 is circular, and the molded rubber material 13 surrounding it is substantially square. The four rubber corners form shock absorbing supports with mounting holes 15 therein.

The center piston 11 is provided with driving means in the form of two polarized ceramic rings 17 and an inertial mass member 18. The ceramic rings 17 are polarized to operate in the longitudinal mode. They have electrodes on the flat parallel faces at the opposite ends of the rings, as is well known in the art. A suitable cement, such as epoxy, is employed for cementing the faces of the ceramic rings to the adjacent members of the assembly. A bolt 19 may be extended axially through the rings to provide a compressional bias stress on the ceramic rings 17. Electrode 20 makes contact with the common potential surface of the ceramic rings 17. An insulated electrical conductor 21 is soldered to the electrode 20 and passes through clearance holes in the structure, as shown in FIG. 1. The other common potential surfaces of the ceramic rings 17 are connected together by the electrodes 20A and by the conductors 22 and 23. The conductors 21 and 23 are also connected to the secondary winding 24 of the transformer 25.

The vibratile annular plate member 12 is driven by two polarized ceramic rings 26 and inertial mass member 27. The inertial mass member 27 is attached to the ceramic rings 26 by a suitable cement, such as epoxy. The ceramic rings are bonded together by an epoxy cement to form an outer cylindrical transducer section of the composite transducer. The common electrode 28 is connected to an insulated electrical conductor 29, which passes through a clearance hole in the transducer housing 30. The electrodes 31 and 32 are connected together by a conductor 33, which in turn is connected to an insulated electrical conductor 34 passing through a clearance hole in the housing 30. The conductors 29 and 34 are electrically connected to the terminals of the secondary winding 35 of transformer 25. The primary winding 36 of the transformer is electrically connected to the conductors 37 and 38 of the rubber covered, waterproof cable 39. The use of the independent secondary windings 24 and 35 permit the independent control of the amplitude and phase of the electrical signals to each transducer structure by varying the number of secondary turns and the polarity of the secondary connections as is well known to anyone schooled in the art.

The open periphery at the skirt of the transducer housing 30 is attached by a suitable rubber cement to the isolating rubber gasket 40. The gasket 40 is also cemented by a suitable rubber cement to the peripheral face of the annular plate piston member 12. A tapered rubber cover or boot 41 covers the outer surface of the housing 30, and the projecting skirt 14 overlaps the bottom portion of the rubber jacket 41, as shown in FIG. 1. This overlapped joint may be cemented together by means of a suitable rubber cement, thereby producing a waterproof seal for the transducer. The transformer 25 and the cable 39 are assembled inside the space contained within the projecting end of the rubber cover or boot 41. After the electrical connections are made, a potting compound 42, such as epoxy, is used to fill the space. A rubber cap 43, fitting over the cable 29, has a projecting skirt portion 44 which overlaps the upper peripheral region of the rubber boot 41. Again, the overlapped region is bonded together by a suitable rubber cement, to completely seal the transducer assembly. The specific details of the mechanical construction for enclosing the transducer elements and providing the waterproof seals may be found in U.S. Pat. No. 3,328,751; especially in the section describing FIGS. 6, 7, 8, and 9.

Figure 3:
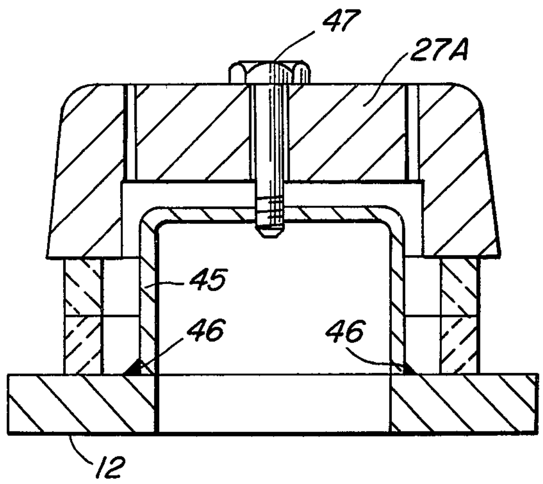
FIG. 3 is a cross-sectional view of the outer one of the dual transducers illustrated in FIG. 1, illustrating a modification of the structure for applying a compressional bias stress to the ceramic elements.

The construction described above is satisfactory, provided the transducer operates at relatively low power or is operated as a receiving hydrophone. For high power operation it may be desirable to provide a bias compressional stress to the outer ceramic rings 26, such as is provided for the rings 17 by the bolt 19 in the central transducer structure. For providing this similar compression bias to the ceramic rings in the outer transducer assembly, the annular plate member 12 may be modified, as illustrated in FIG. 3. A cylindrical cup-like shell 45 may be attached to the annular piston plate 12, by the weldments 46. The inside flat surface at the closed bottom of the cup member 45 includes a tapped hole, at its center, for threadingly capturing the bolt 47, which passes through a clearance hole in the inertial mass member 27A. Thus, the modification illustrated in FIG. 3 provides a compressional bias to the ceramic rings 26. If it is substituted for the outer transducer structure in FIG. 1, both transducer assemblies have compressionally stressed ceramic rings. For the assembly of FIG. 3, the central transducer assembly portion of FIG. 1 is nested within the clearance space provided inside the cup-shaped member 45 of the outer transducer portion of FIG. 1.

The basic invention relates to a dual transducer construction wherein a central transducer assembly is effectively nested within an outer transducer assembly. The electrical signals driving the central transducer may be adjusted independently of the electrical signal driving the outer transducer.

Figure 4:
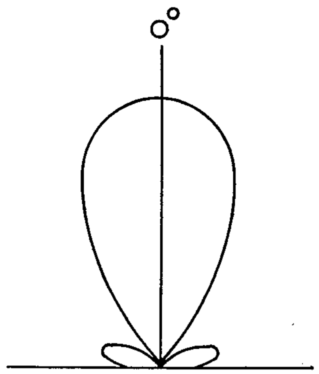
FIG. 4 is a graph showing a directional pattern of the transducer assembly of FIG. 1 when both vibratile plate members are vibrating in the same phase.

The beam pattern of the composite dual transducer system may thus be controlled by adjusting the relative magnitude and phase of the electrical signals driving each of the structures. The beam pattern may also be further controlled by varying the ratio of the radiating area of the central vibratile piston plate 11, as compared to the radiating area of the vibratile annular plate member 12. When the electrical signals driving both transducer elements are in the same phase, the beam pattern is that of a conventional piston transducer, as illustrated in FIG. 4. The magnitude of the secondary lobes in the beam pattern shown in FIG. 4 may be controlled by adjusting the relative magnitude of the signals supplied to each transducer element. Also, the lobes may be controlled by a selection of the diameter of the central piston 11, in comparison to the outside diameter of the vibratile plate 12.

Figure 5:
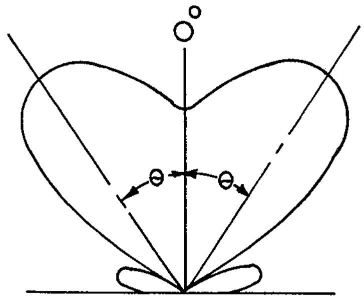
FIG. 5 is a graph showing the directional radiation pattern of the transducer of FIG. 1 when the center element is driven out of phase with the surrounding annular plate member.

When the electrical signals supplied to the ceramic elements 17 have a phase opposite to the phase of the electrical signal applied to the ceramic elements 26, the piston 11 is driven out of phase with the annular plate member 12. For such an out-of-phase condition, the beam pattern is modified as illustrated in FIG. 5. The sound intensity is reduced on the normal 0° axis of the transducer. The maximum sensitivity occurs in a circular band centered at an angle $\theta$, removed from the normal axis. The magnitude of the angle $\theta$ and the relative sensitivity along the axis of maximum response, as compared to the sensitivity along the normal 0° axis, can be varied by changing the diameter of the piston 11 in comparison with the outside diameter of the plate 12. Further control of the angle $\theta$ by varying the magnitude of the out-of-phase signal supplied to the center transducer assembly, as compared to the magnitude of the signal applied to the outer transducer structure.

The invention has been herein described, by way of example, as an underwater transducer. However, it should be apparent that the invention is not limited to underwater transducers and that the teachings may be applied to air transducers. Also, the invention is herein described in connection with mass loaded, polarized ceramic elements driving vibratile plates, but the invention is not limited to any specific type of transducer material. Moreover, the teachings of this invention may be applied to any other of the many types of transducers, which are well known in the art. Therefore, although we have chosen to describe only a few specific examples of our invention, it will be obvious to those skilled in the art that numerous departures may be made. Therefore, our appended claims shall be construed to cover all equivalents falling within the spirit of the appended claims.

We claim:

1. In a composite directional electroacoustic transducer having an axis of symmetry and characterized in that the region of maximum sensitivity occurs in a circular zone subtending a conical angle whose apex is at the intersection of the axis of symmetry of the transducer with the transducer surface, a first electromechanical transducer means driving an annular plate with an opening through its center, a second electromechanical transducer means driving a piston located coaxially within said opening, said piston being spaced peripherally within the opening in said annular plate, the vibratile surfaces of said piston and said annular plate are both perpendicular to said axis of symmetry of the transducer, a first electrical connection means attached to said first electromechanical transducer means, a second electrical connection means attached to said second electromechanical transducer means, a third electrical connection means providing common external terminals for operating said composite transducer from a single source of electrical power, and means associated with at least one of said first and second electrical connection means for modifying the relative phase of the common electrical signal which appears across said external terminals such that the signal appearing across said first electromechanical transducer means is different in phase compared to the signal appearing across said second electromechanical transducer means.

2. The invention in claim 1 and a flexible member bridging the clearance space between the periphery of said vibratile piston and the opening in said annular vibratile plate.

3. The invention in claim 1 wherein the area of said annular vibratile plate is greater than the area of said vibratile piston.

4. The invention in claim 1 further characterized in that the difference in phase between the signals appearing across the first and second electromechanical transducer means is 180°.

5. The invention in claim 1 further characterized in that said surfaces of said annular plate and said coaxial piston are coplanar.

6. A composite directional electroacoustic transducer having an axis of symmetry and characterized in that the region of maximum sensitivity occurs in a circular zone subtending a conical angle whose apex is at the intersection of the axis of symmetry of the transducer with the transducer surface comprising a compound piston having an outer vibrational annular portion and a circumferentially spaced central vibrational portion coaxially located within said annular portion, separate electromechanical transducer means for driving said vibrational annular portion and said vibrational central portion, separate electrical connection means connected to each of said separate electromechanical transducer means, common terminal means for providing a single electrical connection from a common external power source to each of said separate electrical connection means, and means associated with at least one of said separate electrical connection means for modifying the relative phase of the common signal which appears across said common terminal means such that the signal appearing across one of said separate electromechanical transducer means is different in phase from the signal appearing across the other of said separate electromechanical transducer means.

* * * * *